United States Patent [19]
Ma

[11] Patent Number: 6,157,643
[45] Date of Patent: Dec. 5, 2000

[54] SWITCHING FABRIC

[75] Inventor: Jian Ma, Beijing, Switzerland

[73] Assignee: Nokia Telecommunications Oy, Espoo, Finland

[21] Appl. No.: 09/310,683

[22] Filed: May 4, 1999

Related U.S. Application Data

[63] Continuation of application No. PCT/FI97/00670, Nov. 4, 1997.

[30] Foreign Application Priority Data

| Nov. 6, 1996 | [FI] | Finland | 964454 |
| Apr. 4, 1997 | [FI] | Finland | 971432 |

[51] Int. Cl.$^7$ .................................. H04L 12/56
[52] U.S. Cl. .......................... 370/389; 370/388; 370/422
[58] Field of Search .................... 370/386–389, 370/392, 422

[56] References Cited

U.S. PATENT DOCUMENTS

| 4,022,982 | 5/1977 | Hemdal | 370/388 |
| 4,587,649 | 5/1986 | Maddern | 370/387 |
| 4,651,318 | 3/1987 | Luderer | 370/422 |
| 4,661,947 | 4/1987 | Lea et al. | 370/422 |
| 4,701,906 | 10/1987 | Ransom et al. | 370/422 |
| 4,833,468 | 5/1989 | Larson et al. | 370/422 |
| 4,955,016 | 9/1990 | Eng et al. | 370/388 |
| 5,020,052 | 5/1991 | DePrycker et al. | 370/389 |
| 5,022,025 | 6/1991 | Urushidani et al. | 370/422 |
| 5,172,371 | 12/1992 | Eng et al. | 370/422 |
| 5,214,640 | 5/1993 | Sakurai et al. | 370/422 |
| 5,276,425 | 1/1994 | Swanson et al. | 370/388 |
| 5,369,400 | 11/1994 | Bowdon | 370/387 |
| 5,841,775 | 11/1998 | Huang | 370/388 |
| 5,864,552 | 1/1999 | Du et al. | 370/386 |
| 5,945,922 | 8/1999 | Gao et al. | 370/388 |

FOREIGN PATENT DOCUMENTS

| 0 256 702 | 7/1987 | European Pat. Off. . |
| 0 415 629 | 8/1990 | European Pat. Off. . |
| 0 524 350 | 7/1991 | European Pat. Off. . |
| 0 641 108 | 8/1994 | European Pat. Off. . |
| 0 735 727 | 3/1996 | European Pat. Off. . |

OTHER PUBLICATIONS

May 22, 1998, International Search Report for PCT/FI97/00670.

*Primary Examiner*—Huy D. Vu
*Assistant Examiner*—Dung Trinh
*Attorney, Agent, or Firm*—Altera Law Group, LLC

[57] ABSTRACT

The present invention relates to a switching fabric for a packet-switched communications network. Said switching fabric comprises a plurality of input ports and a plurality of output ports, and a plurality of switch elements (SE1–SE5) which are arranged in multiple stages and connected with each other into a switching fabric. Each switch element has a plurality of inputs and outputs and each switch element routes a data packet present at its given input to at least one of its outputs on the basis of routing information (SRT) carried by said data packet. In order to reduce internal blocking in the switch, each switch element (SE1) in at least the first switching stage is formed by a routing network element ($RE_1$) and a shift network element ($SHE_1$), connected in series with each other so that the ith output of the routing network element is connected to the ith input of the shift network element, whereby (1) each routing network element routes the data packets according to preset, fixed rules on the basis of the routing information carried by the data packet, and (2) each shift network element shifts the data packet present on its ith input to its jth output, whereby the indices i and j are paired so that (a) within a given time slot, all the values of j are different from each other within a given shift network element, and (b) within a given time slot, a different value of j is assigned to each of the same-valued i's used in the different shift network elements.

12 Claims, 13 Drawing Sheets

SWITCHING FABRIC

This is a continuation of PCT/FI97/00670 filed Nov. 4, 1997.

SCOPE OF THE INVENTION

The present invention relates generally to switching performed in a packet-switched communications network. More particularly, the invention concerns a switching fabric employed in such a communications network, especially, an ATM network.

BACKGROUND OF THE INVENTION

To aid the understanding of the following description, some terms to be used later in the text will be defined below. As far as possible, the description of the invention is written using concurrent terminology of the English-language literature of the art.

A switch matrix is comprised of a plurality of switch elements which may be Identical or different from each other and which elements are interconnected according to a given topology. In the literature of the art, such a switch matrix may also be called a "switching network", since the switch elements form a network having the given topology. Hence, a switch matrix is considered to have a defined form when its switch elements and their interconnections are known.

Switch elements may be treated as the elementary "building blocks" from which the switch matrix is constructed by connecting a plurality of switch elements into a switching network comprising said plurality of switch elements connected in parallel and in series. A set of mutually parallel switch elements forms a switch stage. Switch elements of consecutive switch stages are connected to each other by internal connections (links) of the switch matrix in accordance with the above-mentioned topology.

In its comprehensive meaning, the term switch Is used to denote the entity configured about a switching matrix. Hence, a switch can denote any means employed for signal switching in a communications network. With regard to the context of the present invention, the switch concerned herein is a packet switch inasmuch the invention is related to switching in a packet-switched communications network, particularly an ATM network. Depending on the case, a switch may also be called a switching system.

ATM (Asynchronous Transfer Mode) is a connection-oriented packet-switching technique, which is selected by the international organization of telecommunications standardization ITU-T as the target transfer mode solution for implementing a broadband multimedia network (B-ISDN). In an ATM network, the problems of conventional packet-switched networks (such as X.25 networks) are overcome by transmitting short packets of a constant length (53 bytes) called cells Each cell comprises a 48 byte payload portion and a 5 byte header. Further discussion of an ATM network herein will be omitted as a nonessential subject to the understanding of the invention. When required, a closer description of this topic can be found in international standards and textbooks of the art.

Switches developed for the needs of a conventional TDM (Time Division Multiplex) network, a kind of an STM (Synchronous Transfer Mode) network, cannot be directly utilized for switching tasks in an ATM network. Neither are switch designs developed for conventional packet-switched networks suitable for switching purposes in an ATM network. Besides the fixed cell length and the limited functionality of the cell header field, the choice of an optimal switching architecture for an ATM network is also affected by the statistical behaviour of the cell stream and the high speed (typically in the order of 150–600 Mbit/s) required from an ATM switch.

FIG. 1 shows an ATM switch, seen, from the outside. The switch has n input ports $I_1$–$I_n$ and m output ports $O_1$–$O_m$. A cell stream CS is present at each port of the ATM switch 11. The header of an individual cell in the data stream is denoted by symbol HD. In the ATM switch, the cells are switched from the input port $I_i$ to the output port $I_j$ and simultaneously the value of the cell header is translated from an incoming value to an outgoing cell. For this purpose, the switch includes a translation table 12 by means of which said header translation is made. From the table can be seen that, e.g., all the cells received at input port $I_1$ and having a header with a value X are switched onto output port $O_1$, whereby the header of the outgoing cells is simultaneously given value K. Cells present on different input ports may have headers of equal value; e.g. cells received at input port $I_n$ with the same header value X are also switched onto output port $O_1$, but their header is given value J on the output port.

Hence, the, main tasks of a switch are: switching of cells (packets) from the input port onto a desired output port and the required "header switching", that is, header translation. Occasionally, as is also evident from the figure, two cells may be simultaneously contending for access onto the same outgoing port. For this purpose, the switch must have buffer capacity so that there is no need for discarding cells under this kind of a condition. Accordingly, the third main task of the switch is to provide the required buffer capacity. In fact, different switch designs can be categorized by the implementation method of these three main tasks and the stage of the switch containing said implementation.

While ATM switch architectures can be categorized by a great number of different criteria, only those related more closely to the switch configuration according to the present invention will be described in this context, thus helping the reader to understand the description given below.

One of the main decisions required in the design of a switch architecture is the type of switching fabric to be employed. The different alternatives can be categorized in two major classes: single-stage and multistage switching fabrics. In single-stage switches, the input and output ports are connected to each other via a single stage only. Then, also packet switching takes place in a single stage only. As switch designs may in reality have hundreds or even thousands of input and output ports, their practical implementations are typically of the multistage type. In a multistage switch, switching is carried out by switch elements arranged in multiple stages.

Multistage switches may be further subdivided into single-path and multiple-path types depending on whether a single path or multiple paths is/are provided between a given input port and a given destination port. Multistage switching fabrics are also frequently denoted by abbreviation MIN (Multistage Interconnection Network). As the switching fabric according to the invention is of the multistage type, the description below relates only to multistage switching fabrics (MINs).

Another design choice to be made concerns the internal structure of the MIN which may internally connection-oriented or connectionless. It must be noted herein that, while the ATM network in itself is implemented using a connection-oriented packet-switching technique, the switch used therein can anyhow be internally connectionless.

A still another characterizing property of a switch is the location of routing information. One possibility is to store the routing information locally in the switch element memory in the form of routing tables, whereby each switch element can, based thereon, individually perform the translation of the virtual channel identifier (VCI). According to another approach, the routing information is contained in a self-routing tag, which is added to the cell at the input edge of the switch.

In a connection-oriented switch, path routing takes place in a preset manner already in the establishment phase of the connection (hence known as preset path routing), whereby all cells belonging to the same virtual connection will pass via the preset path. If the routing scheme keeps the routing information in routing tables of the switch elements, the tables are updated during the establishment of the connection. Respectively, if the routing information is included in the self-routing tag of the cell, this identifier which serves to determine cell routing in a unique manner is attached to the cell at the input edge of the switch.

In a connectionless switch, the routing decision is made separately per each cell. This means that cells belonging to the same virtual connection can pass through the switch via different routes. Also herein, the routing information can be placed in the routing tables of the individual switch elements, or alternatively, the cell can be tagged with the routing information by attaching the above-mentioned identifier tag to the cell. Then, the significant bits of the tag have no fixed role in the routing operation, but instead, a switch element recognizing those bits can route the cell either in a randomized manner or according to a given algorithm. If the switch can offer several connection paths, the cell stream may be shared statistically evenly over all available paths, thus reducing the probability of internal blocking.

Today, two different approaches are utilized in the design of ATM switches in order to avoid congestion due to internal blocking.

According to the first approach, the switch uses a great number of internal links or switch elements in its internal stages. However, with the increasing number of internal links or switch elements, the switch structure becomes complicated making the implementation of large switches very clumsy. An example of this principle is presented by the switch disclosed in U.S. Pat. No. 4,955,016 known as a growable Knockout switch.

According to the second approach, the switching matrix is formed by switch elements complemented with individual output buffers or shared buffers. This principle requires a complicated arrangement of buffer control. Moreover, large-capacity buffers are needed to assure a sufficient service quality, whereby the cell propagation delay increases and the switch element becomes highly complicated. An example of this latter type of switch is discussed in publication Weng, Hwang: "Distributed double-phase switch", IEE Proceedings-I, Vol. 138, No. 5, October 1991, pp. 417–425.

As known from the art of circuit-switched switches, the Clos architecture is advantageously characterized by low congestion and high modular growability. In conjunction with the ATM communications, however, the need for either buffers or a large number of internal links makes the implementation of the switch complicated. Moreover, since this type of switch provides several alternative routes between a given input and a given output, the computation of an optimal routing set for the different connections during each time slot becomes a clumsy, time-consuming operation, because it needs global (the entire switch covering) information on connection requests related to each time slot. Hence, the internal routing creates a bottle-neck which is limiting to the performance of the switch. In an ATM switch, it is practically impossible to compute such an optimal routing set during the period of a time slot (equal to the period of a cell).

The routing algorithms of a Clos architecture switch have been studied for quite a long time, particularly the so-called randomized-routing algorithms have been a subject of intensive studies due to their simple structure and distributed routing property (by sharing the load of routing over the set of switch elements), whereby they offer an advantageous solution in terms of optimized switch performance. Though this type of randomized-routing algorithm Is capable of reducing congestion in the internal stage(s) of the switch, complete elimination of congestion cannot be attained, because the algorithm is not able to remove internal contentions in the switch. (The term contention herein refers to a case of two or more cells contending simultaneously for access to the same switch element output port.)

SUMMARY OF THE INVENTION

It is an object of the invention to overcome the above-described drawbacks and to offer a solution capable of reducing internal congestion in the switch, yet keeping the implementation of the switch so uncomplicated that even large-capacity switches will become easier than In the prior art.

The goal of the invention is achieved by means of a switching fabric according to the invention characterized by what is stated in the appended claims.

The invention is based on the concept of providing the switch with such an input stage that is capable of both distributing the incoming packets evenly between the internal stages of the switch and also steering packets potentially contending for the same output in the internal stage to different switch elements of said internal stage.

Since the switching fabric according to the invention achieves lower internal blocking than that of a switch based on the conventional randomized-routing algorithm, the buffer sizes required in the switch elements according to the invention can be made smaller than those required in the prior art. Respectively, the Interconnection capacity of the switch can be reduced. The switch interconnection capacity is expressed as an integral number indicating the maximum number of data packets destined simultaneously for the same output, that the switch can accept. Hence, by virtue of the solution according to the invention, a switching fabric can be implemented so that a simpler structure can be combined with a reduced level of internal blocking.

In an embodiment of the invention, the switching stage according to the invention can provide a given output port with a distinctly higher performance over the other output ports In a preferred embodiment of the invention, this property is utilized through altering the function of the switching stage according to the Invention by means of a feedback circuitry so that the output port of elevated performance will be the port with the highest load.

BRIEF DESCRIPTION OF DRAWINGS

In the following, the invention and its preferred embodiments are described in greater detail with reference to the examples of FIGS. 2–16 illustrated in the appended drawings in which

FIG. 3a shows an example of path routing in a conventional Clos switching network;

FIG. 3b shows the format of the self-routing tag used in the switching network of FIG. 3a;

FIG. 14a shows a switching fabric according to the invention with five switching stages;

FIG. 14b shows the format of a self-routing tag suitable for use in the switching fabric of FIG. 14a;

DETAILED DESCRIPTION OF THE INVENTION

Figure 1:
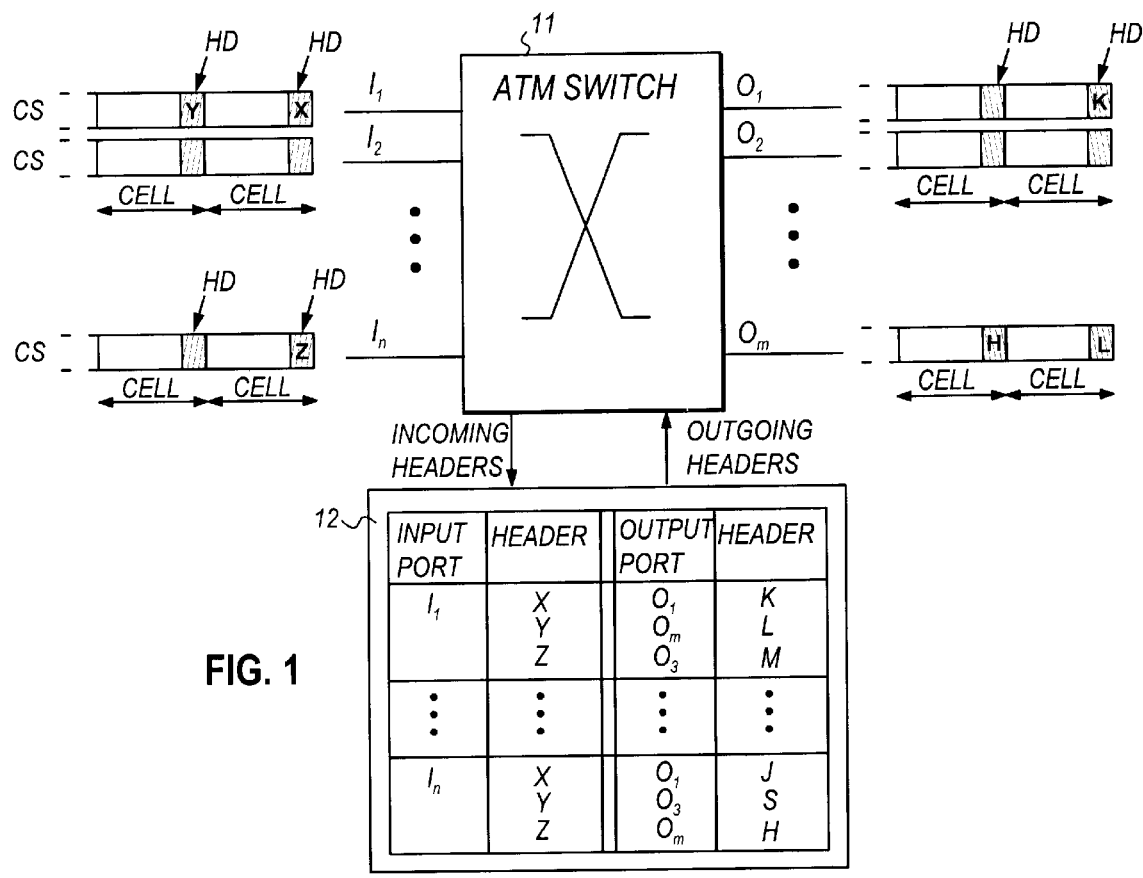
FIG. 1 shows the basic configuration of an ATM switch.
Figure 2:
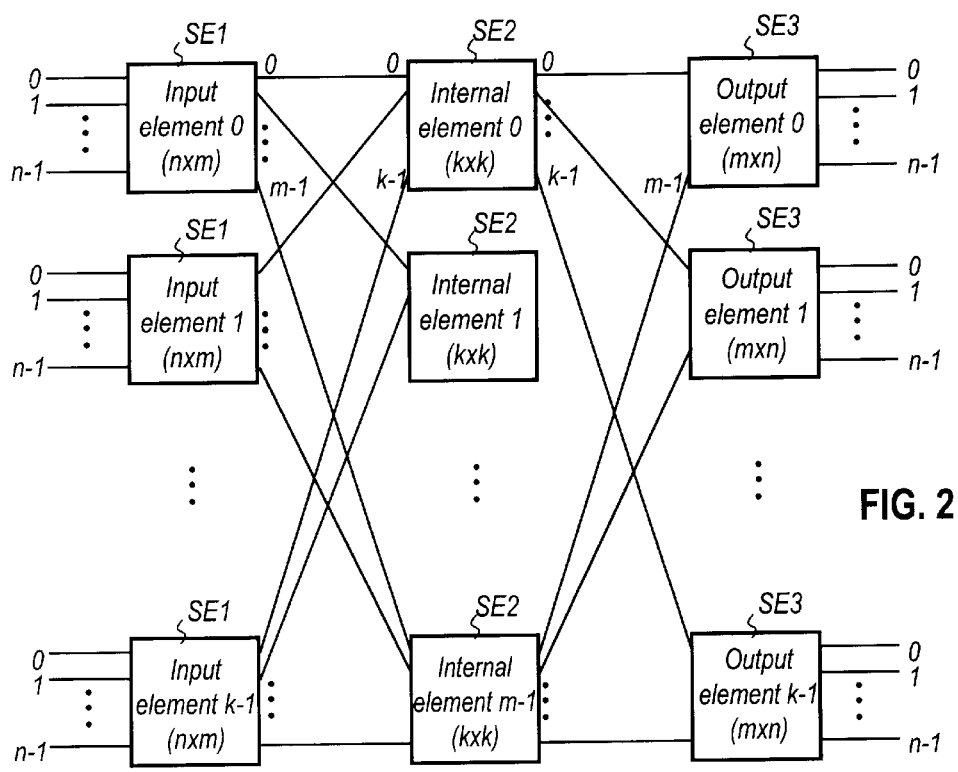
FIG. 2 shows a conventional Clos switch.

Referring to FIG. 2, therein is elucidated the structure of a three-stage Clos network having both the first and third stage comprised of k switch elements SE (numbered from 0 to (k-1)). The switch elements of the first stage are denoted by symbol SE1, those of the second stage by symbol SE2 and those of the third stage by symbol SE3. Each of the first stage switch elements has n inputs and m outputs. Respectively, each of the third stage switch elements has m inputs and n outputs. The internal stage between the input and output stages has an aggregate number of m switch elements, each with k inputs and k outputs. The switch elements of the first stage are connected to elements of the second stage so that each output of a given switch element is connected onto the input of a different switch element in the second stage. Moreover, the switch elements of the first switch stage are connected onto separate inputs of each switch element of the second stage. To put it more precisely, output i of switch element i in the first stage is connected onto input i of switch element j in the second stage. The second and third stage are interconnected in the same manner, that is, output j of switch element i in the second stage is connected onto input i of switch element j in the third stage. In the following discussion, the stages of the above-described type of three-stage switch are denoted so that the first stage is called the Input stage, the second stage the internal stage and the third stage the output stage. The switch element of the input stage may also be called shortly an input element, the switch element of the internal stage an internal element and the switch element of the output stage an output element.

The properties common to all Clos networks are: (1) each internal stage element is connected to the corresponding outputs of each input element and to corresponding inputs of each output element, (2) switch input i and output j can be connected to each other via any internal stage element, and (3) the number of alternative paths between switch input i and output j is equal to the number of internal stage switch elements.

In a Clos network, the incoming traffic present at the switch can be described by an incoming traffic matrix T, and correspondingly, the path connections by a switching matrix C. In the matrix T, element (i,j) represents an incoming cell at the ith input port of the jth input stage switch element, whereas the value of element T(i,j) represents the switch element assigned to be the output element for the packet (cell) in the output stage. In the matrix C, element C(i,j) represents the connection between the ith output of the jth input stage switch element and the jth input of the ith internal stage switch element, whereas the ith element of the kth column gives the output stage switch element address at the ith output of the kth input stage switch element. Respectively, the jth element of the hth row gives the output stage switch element address at the ith input of the hth internal stage switch element. On the basis of the above-given notation, it can be seen, among other things, that if more than one element of the matrix C has the same value on the same row, the packets represented by these elements will contend for the same output port of the same Internal stage switch element.

Figures 3A, 3B:
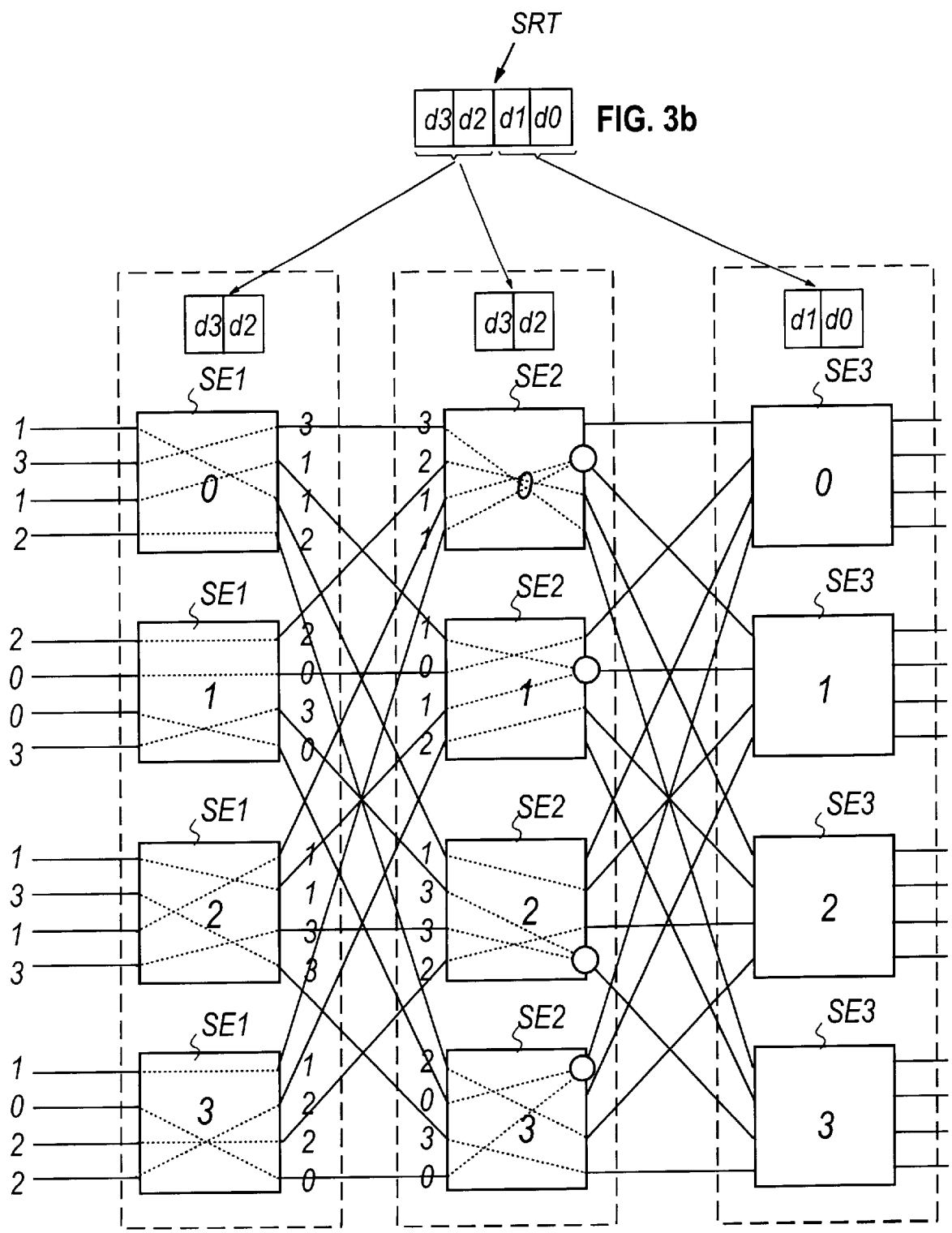

In the following is discussed an exemplifying situation in a three-stage switch of size 16'16 (16 inputs and 16 outputs), in which n=m=k=4 and whose configuration is shown in FIG. 3a. The switch elements and their ports are numbered starting from zero. As shown in FIG. 3b, such a three-stage switch typically uses a self-routing tag SRT comprising four successive bits denoted by reference symbols d0–d3. In the first and second stage are interpreted the two left-most bits d3 and d2 which address the desired output switch element. In the last stage containing the output switch element are interpreted the two right-most bits d0 and d1 which address the desired output port within said output switch element. FIG. 3a shows the bits to be interpreted in the different stages of the switch. (It must be noted herein that if the first stage is a randomized-routing stage, bits d3 and d2 do not necessarily have any meaning in the first stage or at least they can be interpreted in different manners in the different input elements in order to achieve pseudo-randomized routing.)

In a switch of the type shown in FIG. 3a, the incoming traffic matrix and the switching matrix valid for a given time slot period may have a content such as, e.g.:

$$T = \begin{bmatrix} 1 & 2 & 1 & 1 \\ 3 & 0 & 3 & 0 \\ 1 & 0 & 1 & 2 \\ 2 & 3 & 3 & 2 \end{bmatrix} \quad C = \begin{bmatrix} 3 & 2 & 1 & 1 \\ 1 & 0 & 1 & 2 \\ 1 & 3 & 3 & 2 \\ 2 & 0 & 3 & 0 \end{bmatrix}$$

A path arrangement corresponding to this kind of situation is elucidated in FIG. 3a, wherein the figure is complemented with the values of the matrix elements and by marking with dashed lines the corresponding paths routed via the switch elements. As can be seen from matrix T, it contains five one's, which means that an aggregate number of five packets are destined for the same switch element no. 1 of the output stage. This means that even if four packets, or cells, could pass via different switch elements of the internal stage, at least one of the cells cannot be routed to the desired switch element of the output stage. Additionally, the matrix C has two one's on both the first row and the second row, which further means that two cells will contend in the internal stage for the second output of the first and second switch element, respectively (in the element numbering, the second outputs correspond (are linked) to output stage switch element no. 1). Also herein, contention prevents those two cells from gaining simultaneous access to output stage element no. 1. An equivalent contention situation occurs for the fourth output of the third internal stage switch element (due to two three's on the third row of the matrix) and for the first output of the fourth internal stage switch element (due to two zeros on the fourth row of the matrix). Outputs subject to the contention situation are marked by circles in FIG. 3a From the above-described example It is evident that if the cells were routed according to the matrix so that each cell were connected on its respectively destined output of the input stage switch element (that is, the cell destined for output stage switch element 0 on input element switch output 0, the cell destined for output stage switch element 1 on input element switch output 1, etc.), contention situations would occur to the internal stage switch elements, inasmuch in this case the cells, which are present on different inputs of the input stage switch elements, but are destined for the same output switch element, would be connected to the same switch element in the internal stage (e.g., all cells with address zero would contend for the first switch element of the internal stage). However, this kind of situation can be eliminated if each of these cells by their address for the same output stage switch element can be passed to different switch elements in the internal stage. The arrangement according to the invention is based on this concept.

Figure 4:
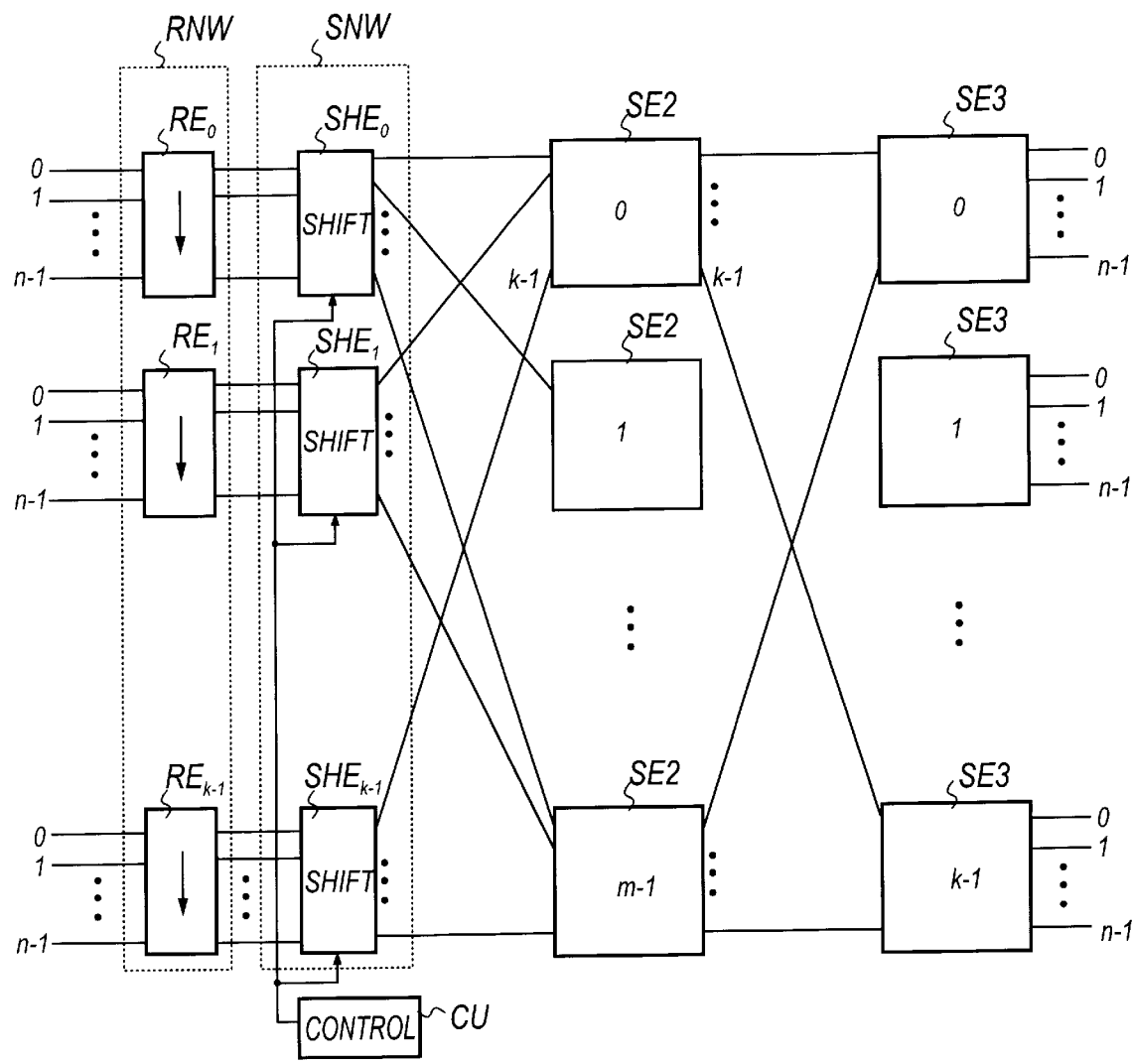
FIG. 4 illustrates the structure of a switching fabric according to the invention.

As is evident from the above discussion, a portion of the internal path of the switch can be such that therein the cells are distributed maximally evenly over all available paths using, e.g., randomized distribution. According to the invention, in the novel arrangement the input stage using randomized distribution is replaced with such an input stage in which a routing network and a shift network are connected in series. In FIG. 4 is elucidated the operating principle of the novel switch configuration. The input stage of the switch is divided into two successive parts, the first of which is formed by the routing network RNW and the second by the shift network SNW. The routing network comprises k mutually identical routing network elements $RE_i$ (i=0, 1, ..., (k-1)), each having n inputs and n outputs. The shift network in turn comprises k mutually identical transfer network elements $SHE_i$ (i=0, 1, ..., (k-1)), each also having n inputs and n outputs. Output j of element $RE_i$ is connected to input j of element $SHE_i$. Thus, such a combined routing/shift network makes it possible to distribute cells, which are destined for the same switch element of the output stage, over different switch elements In the internal switch stage. The routing network routes the cells using a fixed routing algorithm, whereafter the shift network directs cells destined for the same output element so that the cells are connected to different switch elements in the internal stage. The function of the shift network is controlled by control unit CU.

According to the invention, routing in the switch elements of the routing network is performed using a preset, fixed routing algorithm. Thus, each routing network element RE, uses the same fixed, preset rules which determine the output port of the routing network element for a given output element address. For the implementation of the routing algorithm, two preferred alternatives are available as described above.

Figure 5:
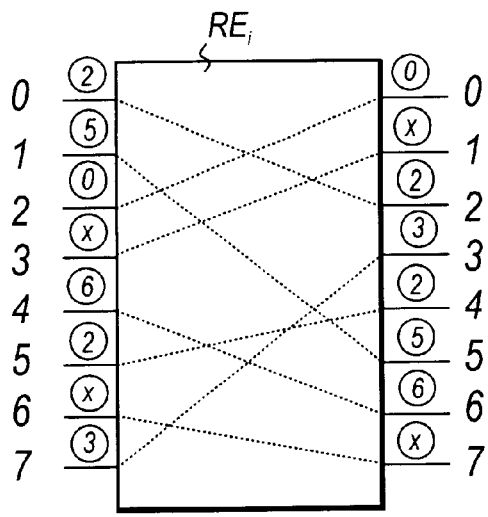
FIG. 5 illustrates the function of a first preferred embodiment of a single switch element for the routing network of the switching fabric according to the invention.

In FIG. 5 is elucidated a routing network element operating according to the first preferred alternative. In this routing method, the routing network element routes the cell to that output of the element which corresponds to the address of the output stage switch element destined in the cell header. The diagram of FIG. 5 illustrates a routing network element $RE_i$ of eight inputs and eight outputs denoted by numbers from zero to seven. The incoming cells are indicated by circles containing a number which represents the address of the output switch element. According to the method, the cells are routed in each routing network element to the output corresponding to the address of the output switch element; that is, cell tagged with address 0 is routed to output 0, cell tagged with address 1 is routed to output 1, etc. After this, cells initially destined for reserved outputs are routed in a randomized manner to outputs which are still vacant. Also cells not transporting user data (idle cells) are routed on in a randomized manner to outputs still vacant.

In the exemplifying case, cells present at inputs 0,1,2,4 and 7 are first routed to outputs 2,5,0,6 and 3. The cell (with address 2) contending for input 5 is routed to output 4 of the still vacant outputs, and cells void of user data present at inputs 3 and 6 are routed in a randomized manner to vacant outputs 1 and 7.

According to the first preferred embodiment of the invention, the routing network can be Implemented, e.g., in the same manner as one stage of a conventional tandem-banyan switch. Such a prior-art embodiment is discussed, e.g., in a reference publication written by Tobagi et al.: "Architecture, Performance and Implementation of the Tandem Banyan Fast Packet Switch," IEEE J. on SAC, Vol. 9, No. 8, Oct. 1991, pp. 1173–1199.

Figure 6:
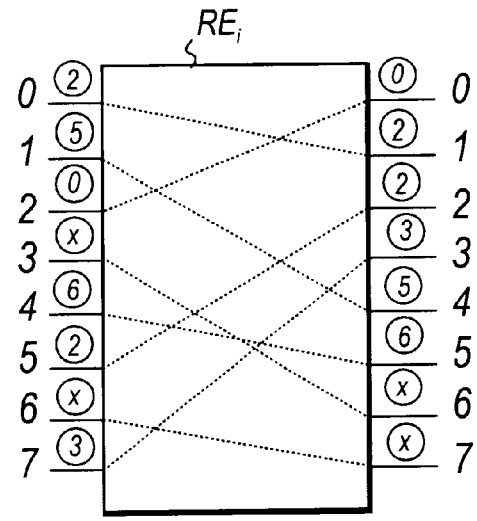
FIG. 6 illustrates the function of a second preferred embodiment of a single switch element for the routing network of the switching fabric according to the invention.

In FIG. 6 is elucidated the structure of a routing network element $RE_i$ functioning according to a second preferred embodiment of the invention. In this case, the routing network element sorts the cells to its outputs by their output element addresses in either an ascending or descending order. FIG. 6 shows the ascending order in which the cell with the smallest output element address is routed to output 0, the cell with the next smallest output element address to output 1, etc. Cells not containing user data are routed to the last outputs. Inasmuch the exemplifying case has two cells of the latter type, they are routed to the two last outputs (outputs 6 and 7).

According to the second preferred embodiment of the Invention, a functional routing network can be implemented using the so-called Batcher network which is known to perform sorting of the above-described type. In a conventional Batcher-banyan type MIN, a Batcher network is arranged in front of a banyan fabric, where its function is to sort cells evenly over all the inputs of the banyan fabric. This type of network is described closer, e.g., in a reference publication by Joseph Y. Hui: "Switching and Traffic theory for Integrated Broadband Networks", Chapter 6, Kluwer Academic Publishers, ISBN 0-7923-9061-X. Since the routing network can be implemented in all cases using conventional techniques, more detailed discussion of the routing network can be omitted herein.

Broadly, all routing network elements are arranged to operate under the same fixed rules. These rules determine the output to which a cell tagged with a given address will be routed. Hence, the routing network element is adapted to operate according to a fixed algorithm, in contrast to, e.g., a switch element utilizing a randomized-routing algorithm.

Broadly described, the shift network SNW following the routing network performs the task of connecting routing network output i to shift network output j. At a given instant, the state of the shift network may be such that, e.g., shift network element 0 connects the first input to the first output, the second input to the second output, etc.; shift network element 1 connects the first input to the second output, the second input to the third output, etc., finally connecting the last input to the first output; shift network element 2 connects the first input to the third output, the second input to the fourth output, etc.

To further minimize the requirements imposed by bursty traffic on the size of buffers, in an advantageous embodiment of the invention the switching state of the shift network is continuously permutated from one time slot to the next. In this method, the shift network in cooperation with the routing network assures that the cells of the bursty input data stream are distributed evenly over the different switch elements in the internal stage and that the cells destined for the same output element are connected to different switch elements in the internal stage.

An advantageous switch model of the shift network may be formulated by the following equation:

$$\text{input}^k(i) = \text{output}^k(i+k+t+c) \mod(n), \quad 0 \leq i, k \leq n-1$$

where input$^k$(j) is the ith input of kth shift network element and output$^k$(j) is the jth output of kth shift network element, t is the number of the time slot whose value may be determined as follows: t=(time slot number) mod(n), c is a (positive) integer and n is the number of shift network element outputs. (Notation mod(n) means that counting is restarted at reaching the value n.)

Figure 7A:
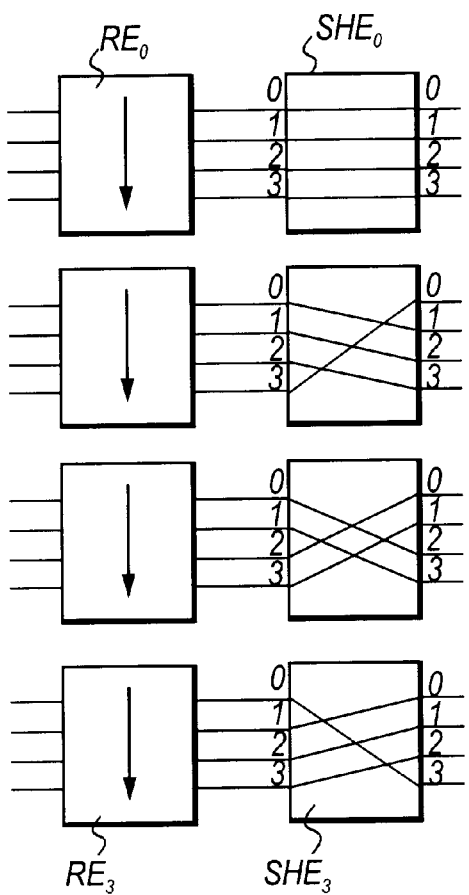
FIGS. 7a–7d show the function of the routing network in the switching fabric according to the invention over a sequence of four time slots.
Figure 7B:
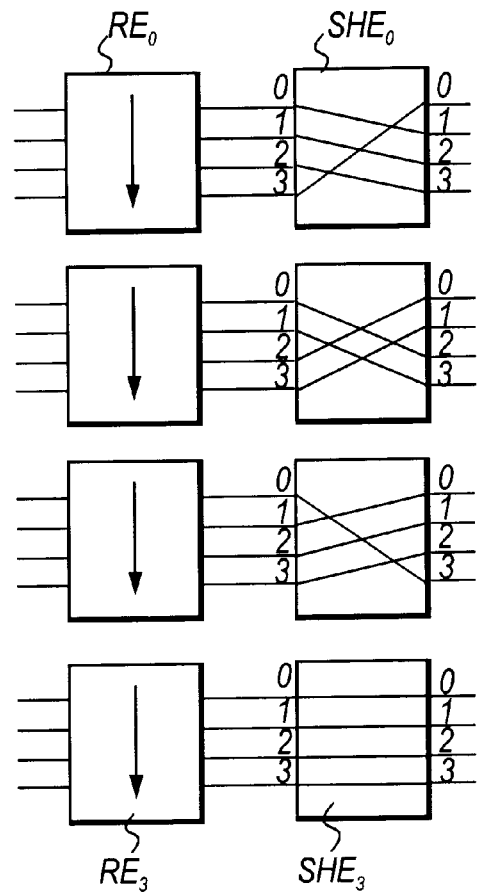
Figure 7C:
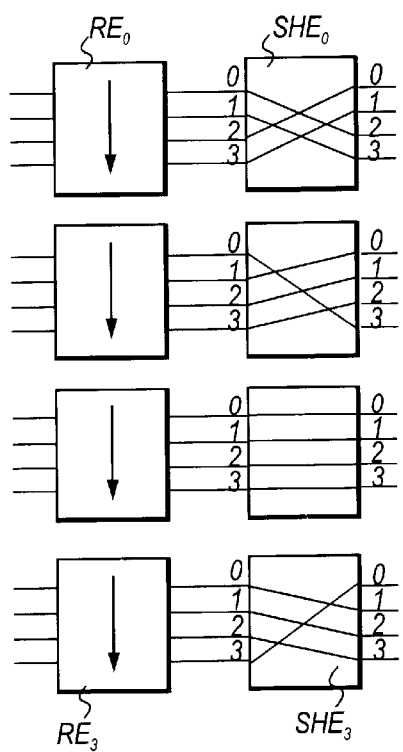
Figure 7D:
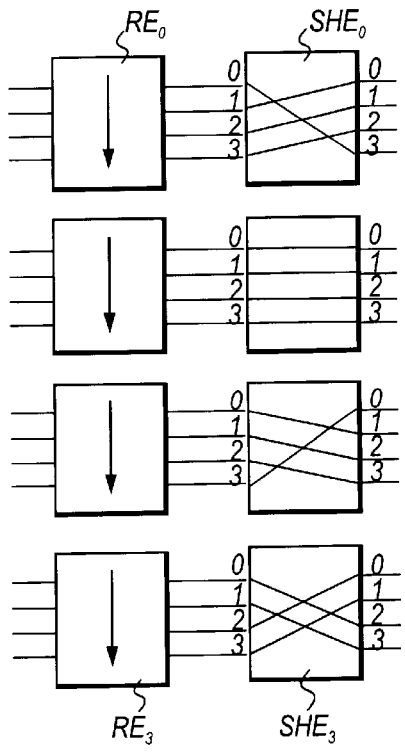

FIGS. 7a–7d illustrate the switching states of the shift network of a 16'16 switch for time slots number zero (FIG. 7a), one (FIG. 7b), two (FIG. 7c) and three (FIG. 7d). Herein, the duration of one time slot is equal to the transmission duration of one cell.

In time slot 0, the first shift network element SHE$_0$ connects its ith input to its ith output, shift network element SHE$_1$ connects its ith input to an output numbered as (i+1)mod(n), whereby the fourth input is connected to the first output (output 0), shift network element SHE$_2$ connects its ith input to an output numbered as (i+2)mod(n), whereby the third input is connected to the first output and the fourth input to the second output, and shift network element SHE$_3$ connects its ith input to an output numbered as (i+3)mod(n), whereby the second input is connected to the first output, the third input to the second output and the fourth input to the third output.

In time slot 1, the situation is changed so that the switching state of each shift network element is advanced by one step with respect to the preceding time slot. In other words, the first shift network element SHE$_0$ connects its ith input to an output numbered as (i+1)mod(n), the second shift network element SHE$_1$ connects its ith input to an output numbered as (i+2)mod(n), etc. In time slots two (FIG. 7c) and three (FIG. 7d), the switching state of each shift network element is again advanced by one step with respect to the preceding time slot.

In FIGS. 7a–7d, the elements of the routing network are marked with an arrow as is conventional in conjunction with sorting networks. The direction of the arrow indicates the direction of sorting so that the arrow points toward the output receiving the cell with the highest-value address.

As is evident from the formula describing the connection model of the shift network, the permutation change from one time slot to another might also take place so that the shift network element advances its state each time by 2 or 3 steps forward (whereby the constant c is not zero, but may get value 1 or 2).

According to the above-given formula, the difference between the connection states of two successive shift network elements is always equal to one step in a certain time slot. This condition is not, however, a mandatory requirement for the implementation, but rather, it is sufficient to have all the shift network elements in different connection states at a given time instant.

Nevertheless, a practical implementation becomes easier if the difference between the connection states of two successive shift network element is always equal to one step and if the shift network element is further arranged to permutate its state in a step-by-step manner.

Figure 8:
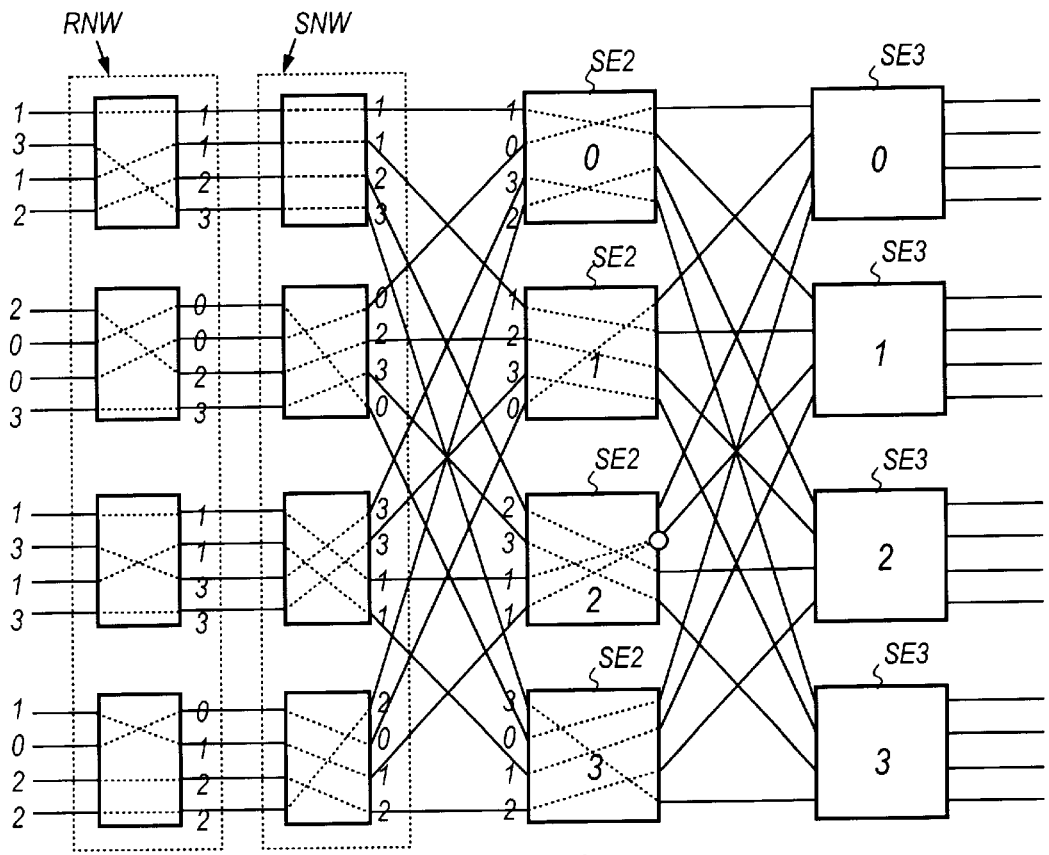
FIG. 8 shows an exemplifying embodiment, equivalent to that of FIG. 3a, of the routing link network in a switching fabric according to the invention.

In FIG. 8 is shown an exemplifying situation corresponding to that of FIG. 3a when the construction of the switch is implemented according to the invention. In this example is assumed that the routing network RNW operates according to the second preferred embodiment of the invention described above, whereby the routing network element is arranged to sort the cells in ascending order according to their output element addresses. As can be seen from the figure, the arrangement according to the invention has only one contention situation in the internal stage (caused by the fact that the number of cells with address one exceeds the number of switch elements in the internal stage by one).

If routing elements of ascending sorting are used as the routing network elements, the switching matrix has such a property that the first input port of the internal stage switch elements has the best performance with respect to cell loss probability. This is caused by the fact that if only one cell tagged with output element address zero is connected to the routing network element, it will always be connected to the same (i.e., first) output. By contrast, if one cell tagged with address one is connected to the routing network element, its output port will be dependent on how many cells with address zero will arrive simultaneously. In other words, the output port assigned for the cell tagged with address j will be determined by number of cells with address i (i<j) existing simultaneously. Because cells tagged with an address different from zero will not affect the output port of cells tagged with address zero, this port has the lowest cell loss probability In the Internal stage. This phenomenon can be detected in statistical simulations. The corresponding property Is possessed by a routing network in which the elements are sorted in descending order. Then, the port highest in the numbering scheme has the best performance.

In a preferred embodiment of the invention, this concept is utilized for optimizing the switching matrix for hot-spot traffic. In the present context, the term hot-spot traffic refers to such a traffic situation in which a plurality of traffic-generating sources try to communicate with the same target (i.e., the hot spot). Hot-spot traffic may occur in a plurality of occasions in, e.g., telephone or computer networks serving, e.g., opinion polling phone numbers in conjunction with TV contests. It has been shown that even if the proportion of hot-spot traffic is very small in the total amount of traffic, it can still hamper the function of the system or network significantly. In order to assure reliable function of the switch also under a hot-pot traffic situation, both the internal switching capacity and the buffers of the switch must be sufficiently large to accommodate the load of the hot-spot traffic. This in turn makes the switch construction more complicated and thus also costlier.

In order to also cope with hot-spot traffic situations without being hampered by the above-discussed drawback, an advantageous embodiment of the invention complements the switching matrix with a feedback arrangement for traffic flow control and with routing tag converters operating on the basis of the feedback information so as to modify the routing of the hot-spot traffic. In this manner, the hot-spot traffic can be routed via the output port with the highest performance. Actually, the routing tag conversion serves for specifically arranging the highest performance for the port passing the hot-spot traffic.

Figure 9:
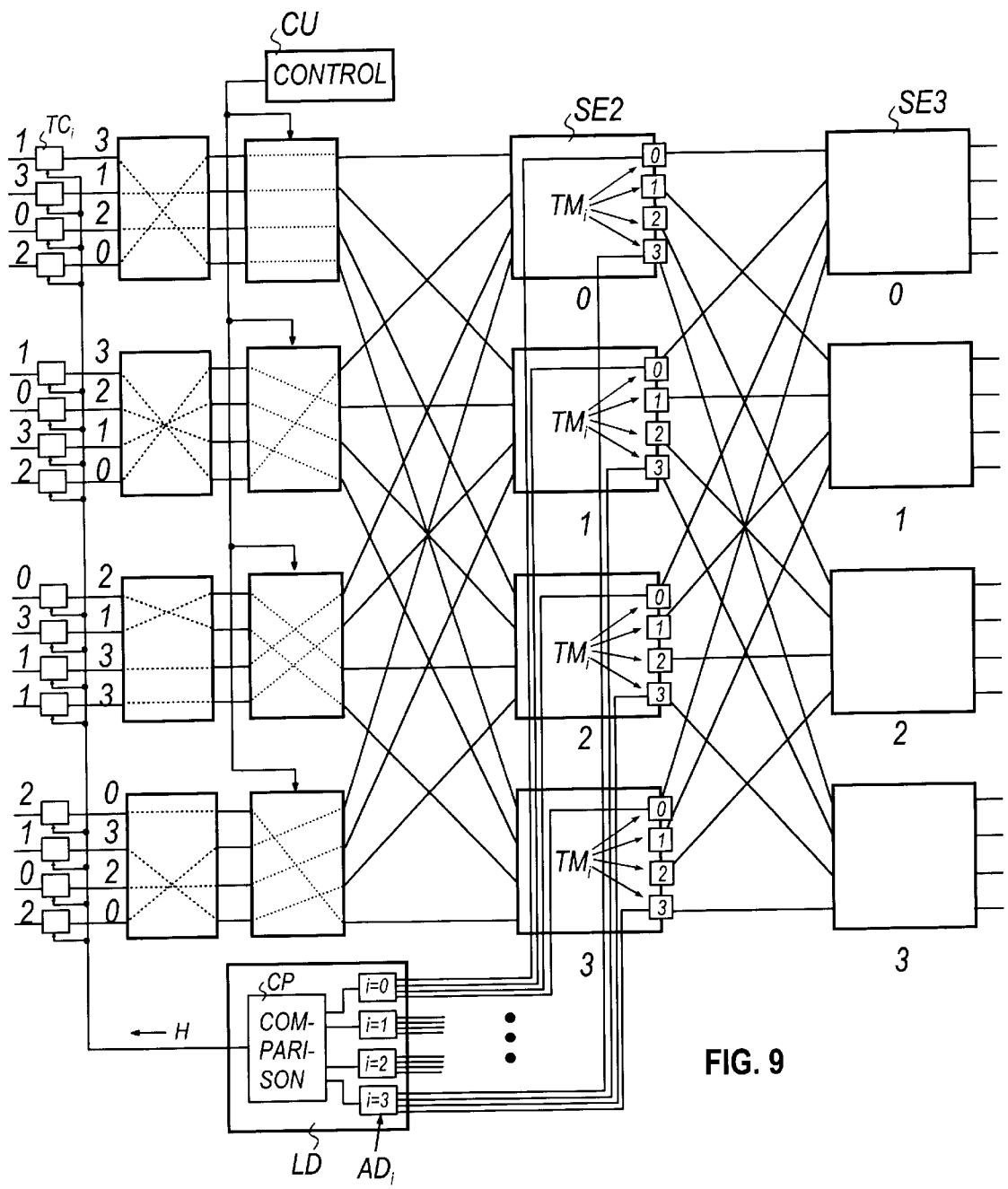
FIG. 9 shows a switching fabric having its function optimized for hot-spot traffic.

This preferred embodiment is elucidated in FIG. 9 showing the basic configuration of FIG. 4 in which n=k=m=4 and the switch elements have their inputs and outputs numbered starting from zero.

The switching matrix is complemented with a feedback circuitry between its internal stage and input stage serving to deliver hot-spot information to the routing tag converters $TC_I$ (i=0, . . . , (n²–1). Each input port of the switching matrix Is provided with a dedicated routing tag converter.

The feedback circuitry comprises a traffic monitor $TM_i$ (i=0, . . . , (n²–1)) on each output of the internal stage and a traffic load detector LD. Each traffic monitor performs traffic load monitoring in a conventional manner its own output. This can be implemented so that, e.g., the monitor counts the number of simultaneous packets time slot by time slot, or alternatively, counts the number of packets received over, e.g., a preset period of time. The traffic load detector circuit LD has n adders $AD_i$ (i=0, . . . , (n–1)) and a comparator CP. The outputs of the traffic monitors are connected to the adders so that on the inputs of the first adder are connected the outputs of the traffic monitors of output zero of each internal stage switch element, on the inputs of the second adder are connected the outputs of the traffic monitors of output one of each internal stage switch element, on the inputs of the third second adder are connected the outputs of the traffic monitors of output two of each internal stage switch element, and on the inputs of the fourth adder are connected the outputs of the traffic monitors of output three of each internal stage switch element. Thus, each adder I has n inputs, and each of these inputs originates respectively from output i of each internal stage switch element. Each adder computes a sum of the numbers it has received and passes the sum further to a comparator CP which selects the largest of the sums and further sends the output address number H (H=0–3) corresponding to the sum and the value of the sum to the tag converters $TC_i$. Herein, the output H represents the hot-spot output, that is, the output subject to the highest packet load.

Each tag converter $TC_I$ translates a part, i.e. the part that relates to the routing network, of the tag attached to the packet arriving at the switch. Said part, $A_{in}$, is translated into a new routing identifier, $A_{out}$, which the routing network uses when forming the routing path for the packet The translation performed by the tag converters can be carried out according to the following procedure:

If $A_{in}$ —H³O,
then $A_{out}=A_{in}$—H,
otherwise $A_{out}=A_{in}$—H+n.

In the example of FIG. 9 is assumed that H=2 and that the routing element sorts the cells in ascending order according to their output element address. The figure indicates the values $A_{in}$ valid prior to the tag converters as well as the values $A_{out}$ available at the outputs of the tag converters as calculated from the values $A_{in}$. By means of the above-described translation, the hot-spot traffic can be forced to pass in the routing network elements via the first output, thus causing that the maximum performance will be given the internal element output passing said hot-spot traffic.

Figure 10:
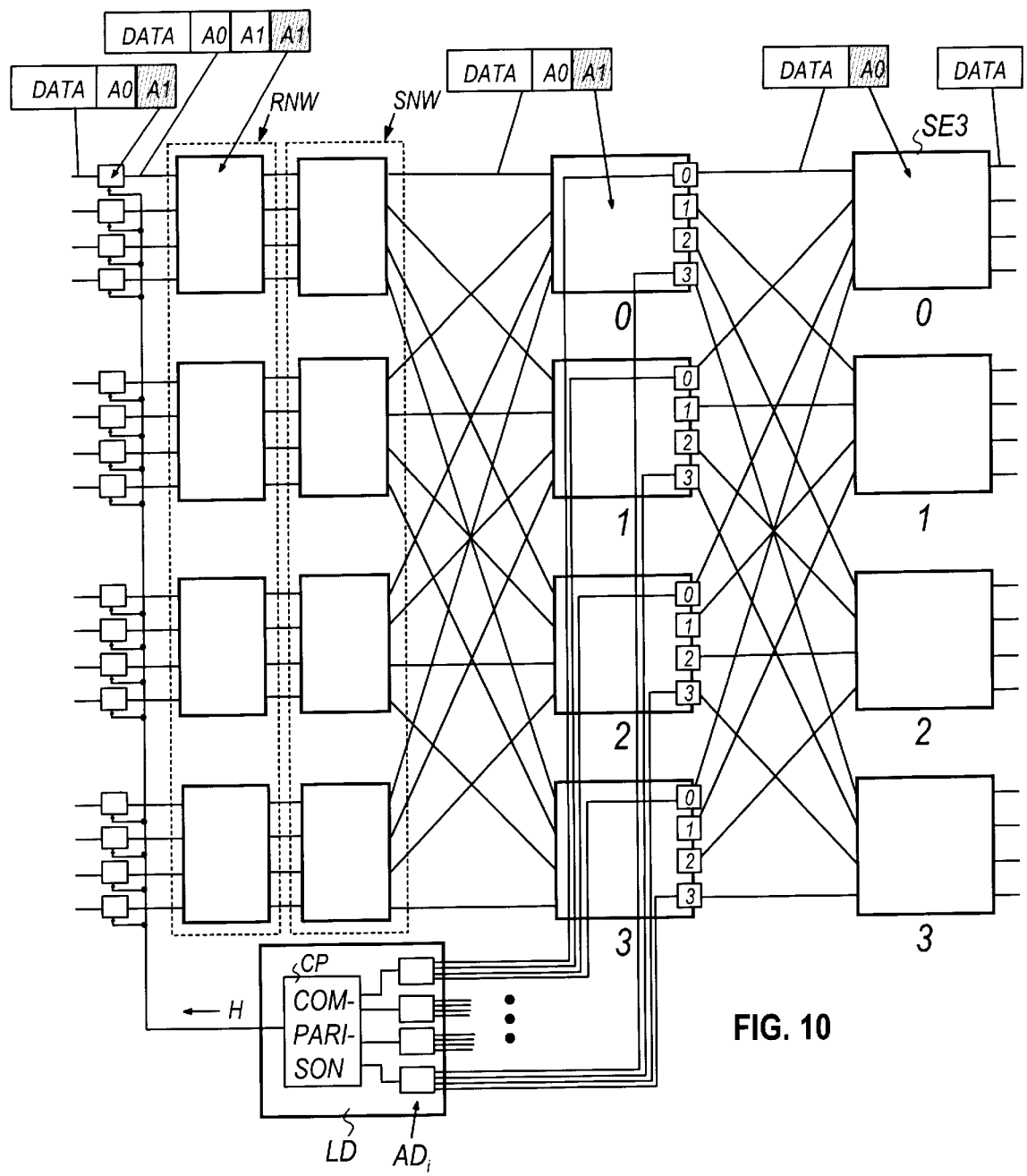
FIG. 10 illustrates the use of the routing identifier in a switching fabric of FIG. 9.

In FIG. 10 is elucidated the passage of packets via the switching matrix of FIG. 9. The incoming packet present at the switching matrix input comprises a data field and a routing tag formed by part A0 and part A1, of which part A1 in a normal case is interpreted in the two first stages of the switch and part A0 in the output stage (cf. FIG. 3b). The tag field A1 gives the output element address and the other tag field A0 defines the output port address in the output element. Each tag converter translates the tag address part Al (corresponding to tag field $A_{in}$) into a new tag address part A1' (corresponding to tag field $A_{out}$) and adds the new tag part to the packet. The routing network routes the packet by means of the new tag part A1' and thereafter removes the new tag part from the packet. Subsequently, the internal stage elements use the tag part A1 in routing the packet to the output stage and the output stage elements use the tag part A0 in routing the packet to their outputs. From either stage, the packet is switched forward without the tag part used by the stage.

Figure 11:
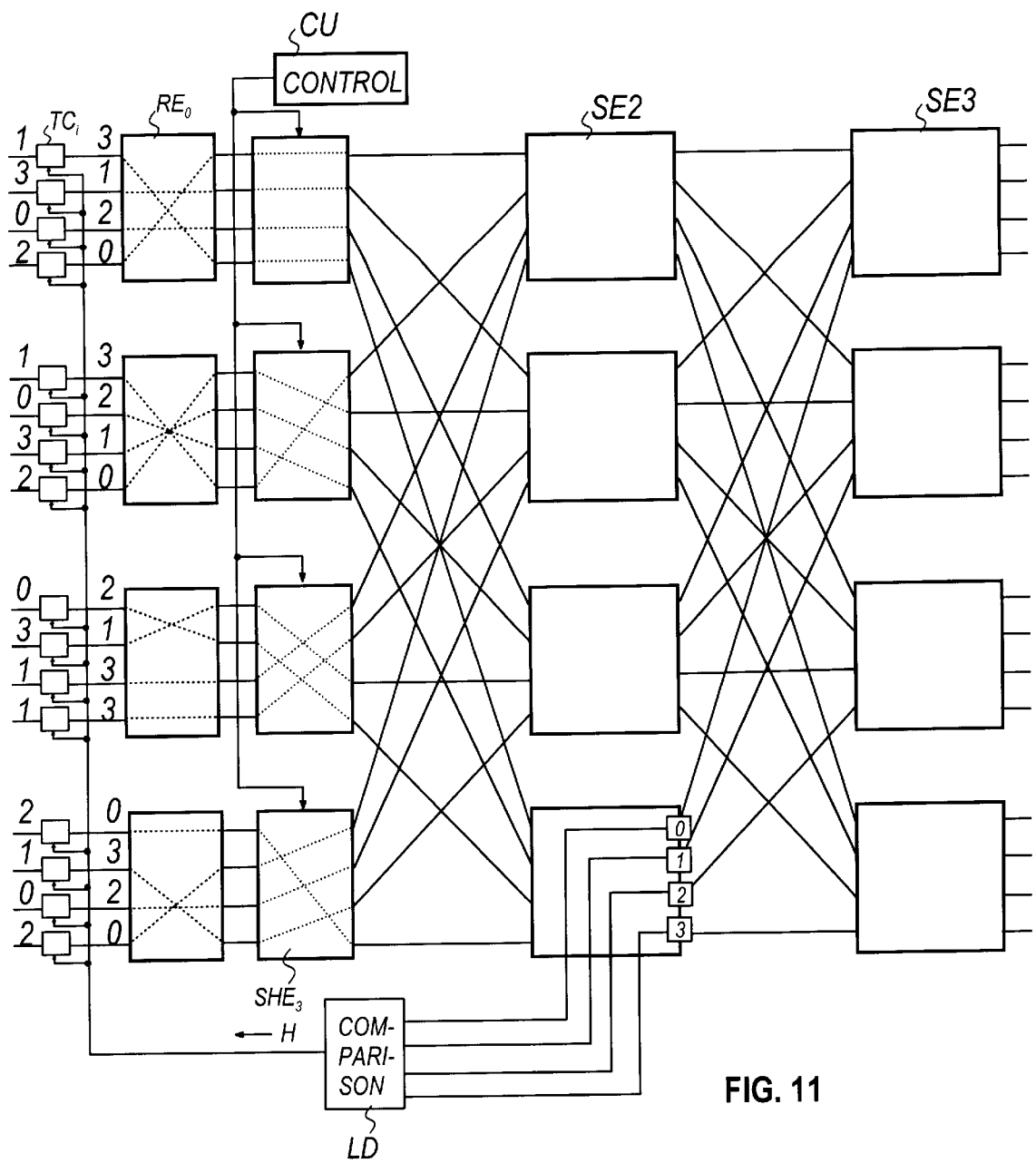
FIG. 11 shows an alterative arrangement for optimizing the function of the switching fabric for hot-spot traffic.

An alternative and simpler embodiment with regard to that of FIG. 9 is to collect the traffic information from a single internal stage element only, whereby also the load detector circuit LD is simplified so that it contains only a comparator for finding the output with maximum traffic load (thus disposing of adders). Such an embodiment is illustrated in FIG. 11

The above-described method is capable of exploiting the port with maximum performance for switching the hot-spot traffic. Thus, the switching matrix dimensioned for hot-spot traffic can be implemented in a more economical manner.

Figure 12:
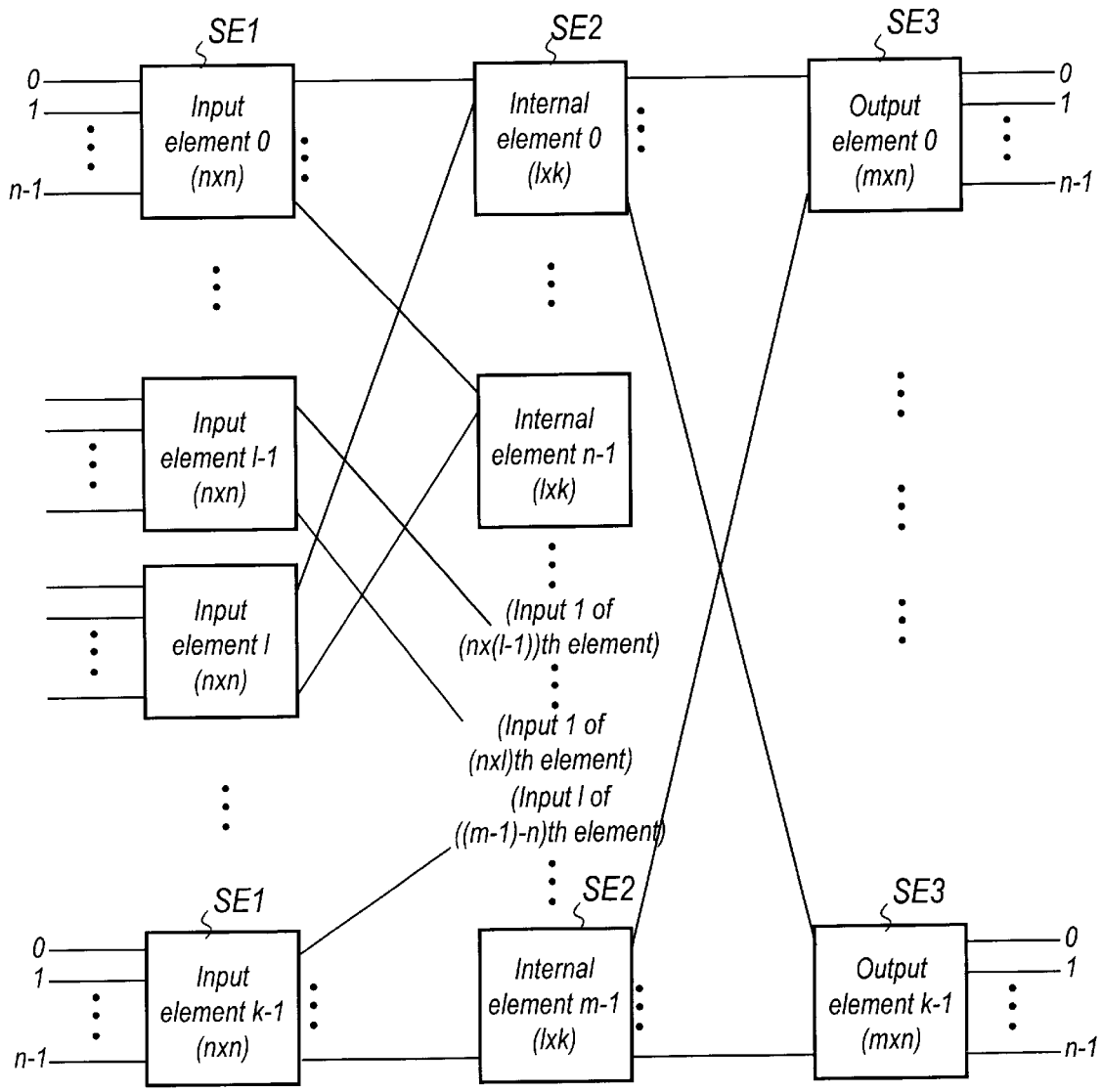
FIG. 12 shows a three-stage switching fabric according to the invention in its generalized form.

The above-described exemplifying embodiments were based on simple examples utilizing fabrics with n'n routing network elements and n'n shift network elements. Moreover, the invention may also be applied to three-stage switching fabrics whose generalized configuration is shown in FIG. 12, wherein the connection pattern between the input elements and internal elements is a so-called shuffle-exchange pattern. The aggregate number of input elements (n'n) is k, the aggregate number of internal stage elements (l'k) is m and the aggregate number of output elements (m'n) is k. The input elements are of the type disclosed in the present application.

Figure 13:
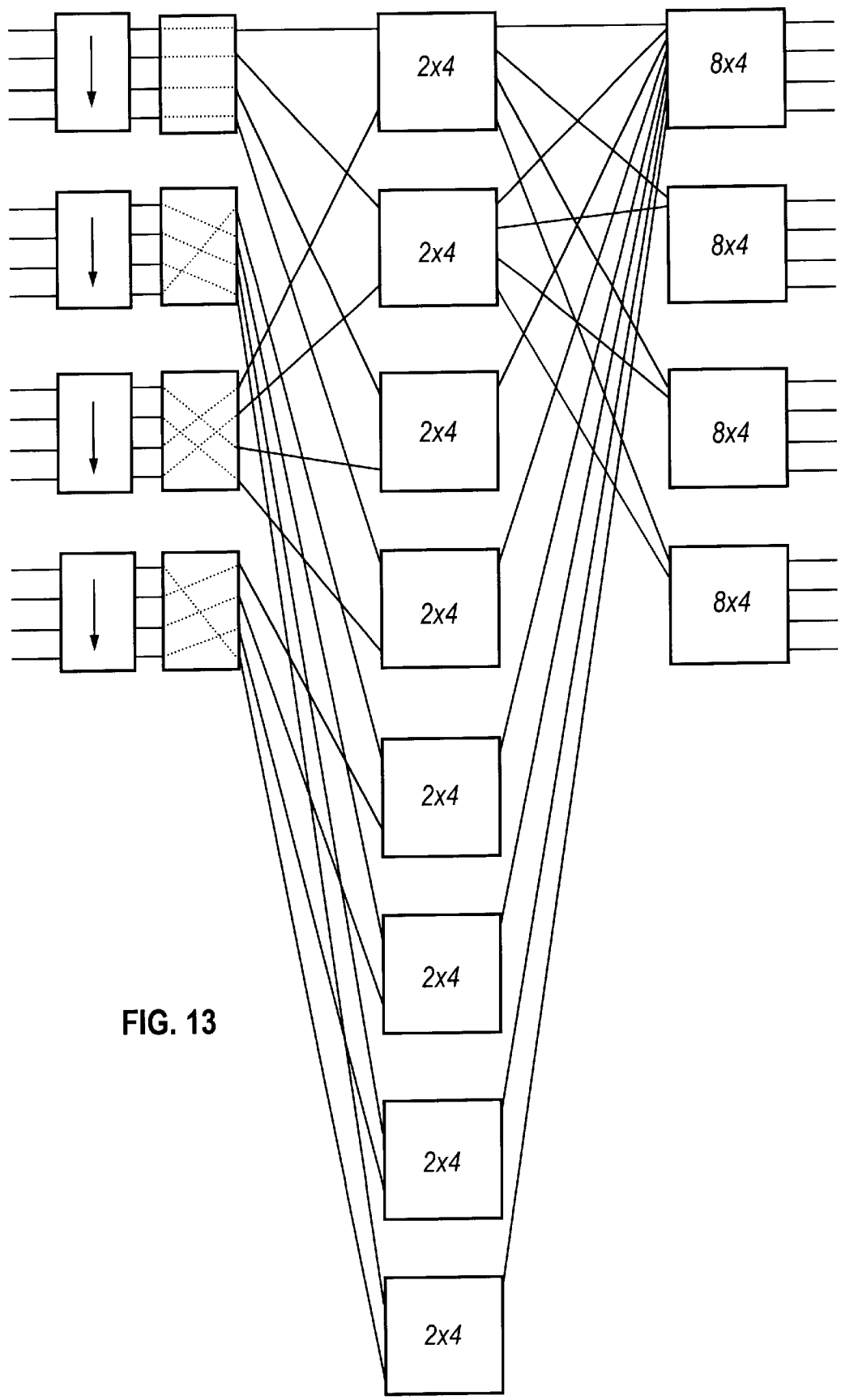
FIG. 13 shows a special case of the switching fabric of FIG. 12.

In FIG. 13 is presented an embodiment based on the switching fabric structure of FIG. 12, herein with the size of the fabric set as n=4, l=2, k=4 and m=8. For greater clarity, all the incoming lines to an output element are shown for the first input element only, and all the lines leaving an internal element are shown for two first internal switch elements only;

In the foregoing, the invention has been elucidated with reference to switches having three stages. In these, the second and third stage are conventional self-routing stages capable of solving contention situations of the output port. The switch elements of the second and third stage may be, e.g., Knockout elements. Since a switch element of this type may be implemented in a conventional manner, their detailed description can be omitted herein.

Furthermore, the arrangement according to the invention can be utilized in switches having more than three stages, e.g., five or seven.

Figure 14:
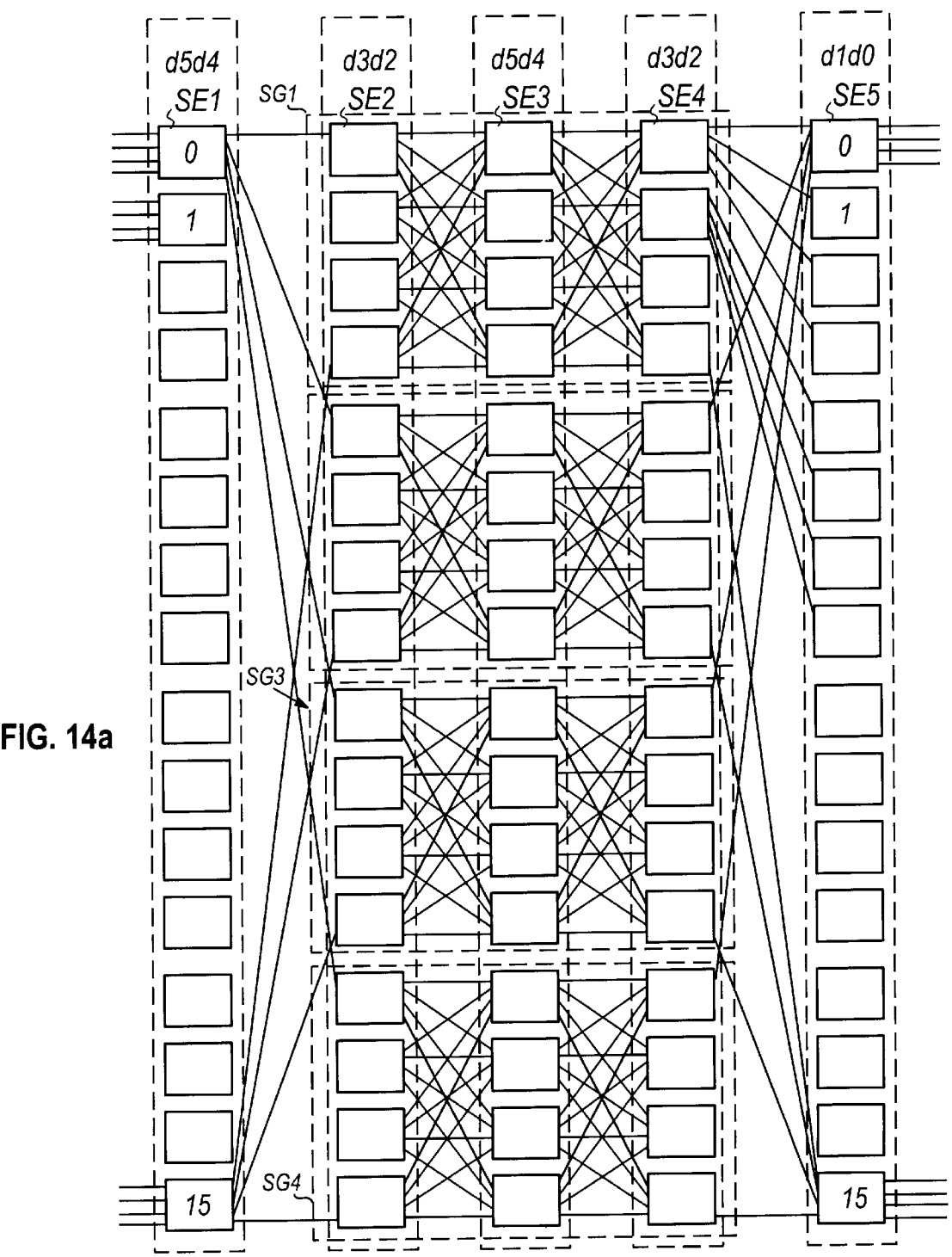

In FIG. 14a is shown an example of switching fabric according to the invention based on a 64'64 fabric with five stages. In the illustrated case, the switching fabric comprises four fabric groups SG1–SG4 of the type shown in FIG. 4, said groups forming the second, third and fourth stage of the switch and being parallel in the sense that no internal links are provided between the separate groups. In the illustrated case, the first switching stage (input stage) comprises 16 switch elements SE1, each with 4 inputs. The kth output of the ith switch element (i=0–15) of the input stage is connected to the Ith input in the kth switching matrix group (k=0–3). In FIG. 14b is illustrated a self-routing tag used in this type of switch, said tag in this embodiment comprising six consecutive bits d0–d5 ($2^6$=64, equivalent to the aggregate number of inputs and outputs), where bits d5 and d4 are interpreted in the first and third stage, bits d3 and d2 in the second and fourth stage, and bits d1 and d0 in the last stage. In the switch, the switch elements of the first and second stages are configured according to the invention from switch elements each comprising a routing network element and a shift network element connected in series. The switch elements of the three last stages are self-routing switch elements of a conventional type in which all the bits of the routing tag are interpreted, whereby two bits are interpreted in each stage (bits d5d4 and bits d3d2 are interpreted in the two first additional stages, respectively).

Figure 15:
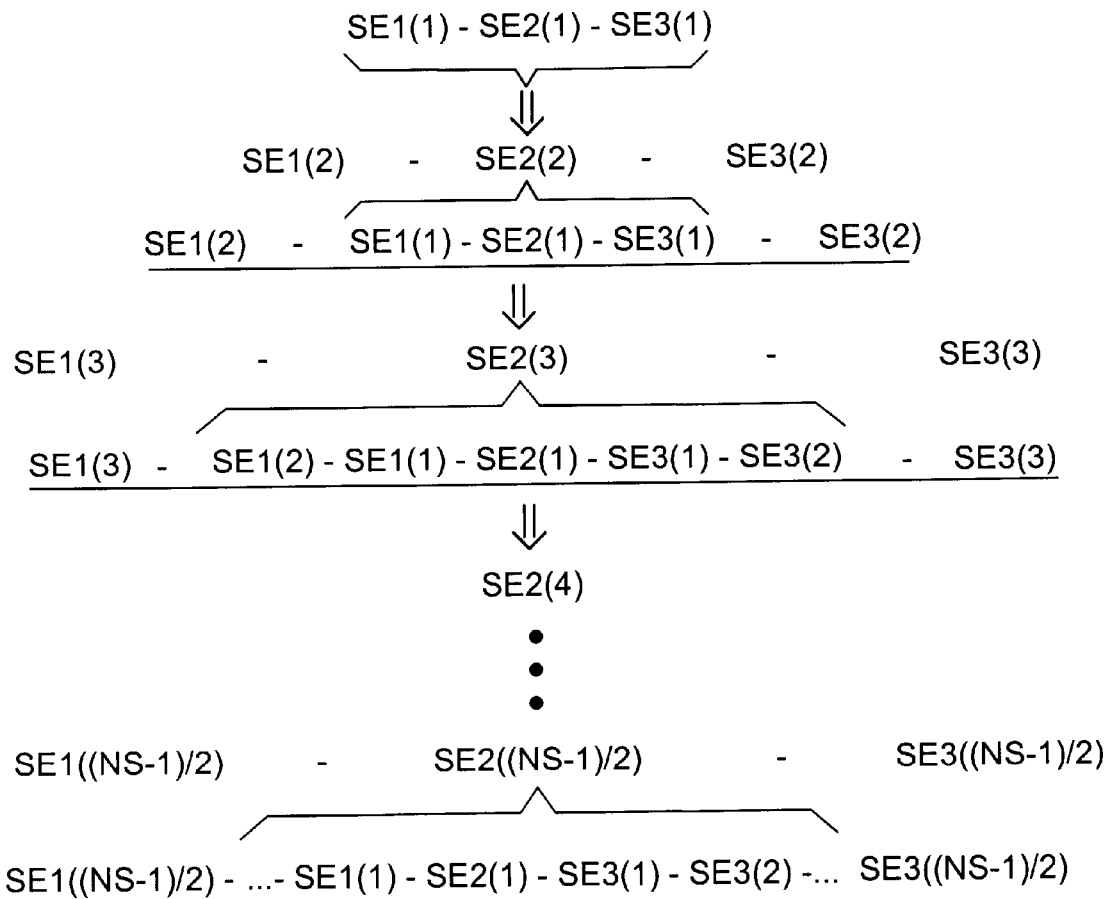
FIG. 15 illustrates the growability of a three-stage switching fabric into a switching fabric of greater number of stages.

With reference to FIG. 15, in the following is briefly described a method of growing a three-stage switch into a multiple-stage switch having an aggregate number NS of stages. Initially, an assumption Is made that $O1^j(i)$ is the ith output of the jth switch element SE1(s), $I2^j(i)$ is the ith input of the jth switch element SE2(s), $O2^j(i)$ the ith output of the jth switch element SE2(s) and $I3^i(i)$ is the ith input of the jth switch element SE3(s), where NS=2s+1 (s=1,2,3¼) and s indicates the number of expansion steps required from a three-stage switch into an NS-stage switch. As mentioned above, the switching rule of a three-stage switch may be expressed as $O1^j(i)=I2^i(j)$ and $O2^j(i)=I3^i(j)$, whereby output $O1^j(i)$ is connected on input $I2^i(j)$ and output $O2^j(i)$ is connected on input $I3^i(j)$. In practice, a switch with NS steps is configured by carrying out the following steps 1–3.

1. A three-stage switch is configured by connecting switch elements SE1(s), SE2(s) and SE3(s) according to the above-expressed rule (e.g., according to uppermost row in FIG. 15 when s=1). Next, the "three-stage" switch thus obtained is defined as a new internal switch element SE2(s+1) (cf. downward pointed arrows in FIG. 15).

2. A new "three-stage" switch is formed by linking switch elements SE1(s+1), SE2(s+1) and SE3(s+1) with each other according to the above-given connection rule.

3. Switch elements SE1(s) are configured into routing/shift networks according to the invention and switch elements SE2(s) and SE3(s) are conventional self-routing, nonblocking switch elements (s=1,2,¼, (NS-1)/2), which means that each switch element in the first (NS-1)/2 stages is an element according to the invention and the rest of the elements are conventional self-routing switch elements.

To extend the switch to NS+2 stages, the above-described steps are repeated (simultaneously increasing the value of s by one). In the diagram of FIG. 15, the third row represents a five-stage switch, the fifth row a seven-stage switch, etc. The underlining denotes the entity from which the internal switch elements of the new three-stage switch are formed. The lowermost row represents an NS-stage switch.

If the switching fabric is grown into, e.g., a seven-stage switch, the three (=(7-1)/2)) first stages are formed from switch elements according to the invention and the four last stages from conventional self-routing switch elements.

Figure 16:
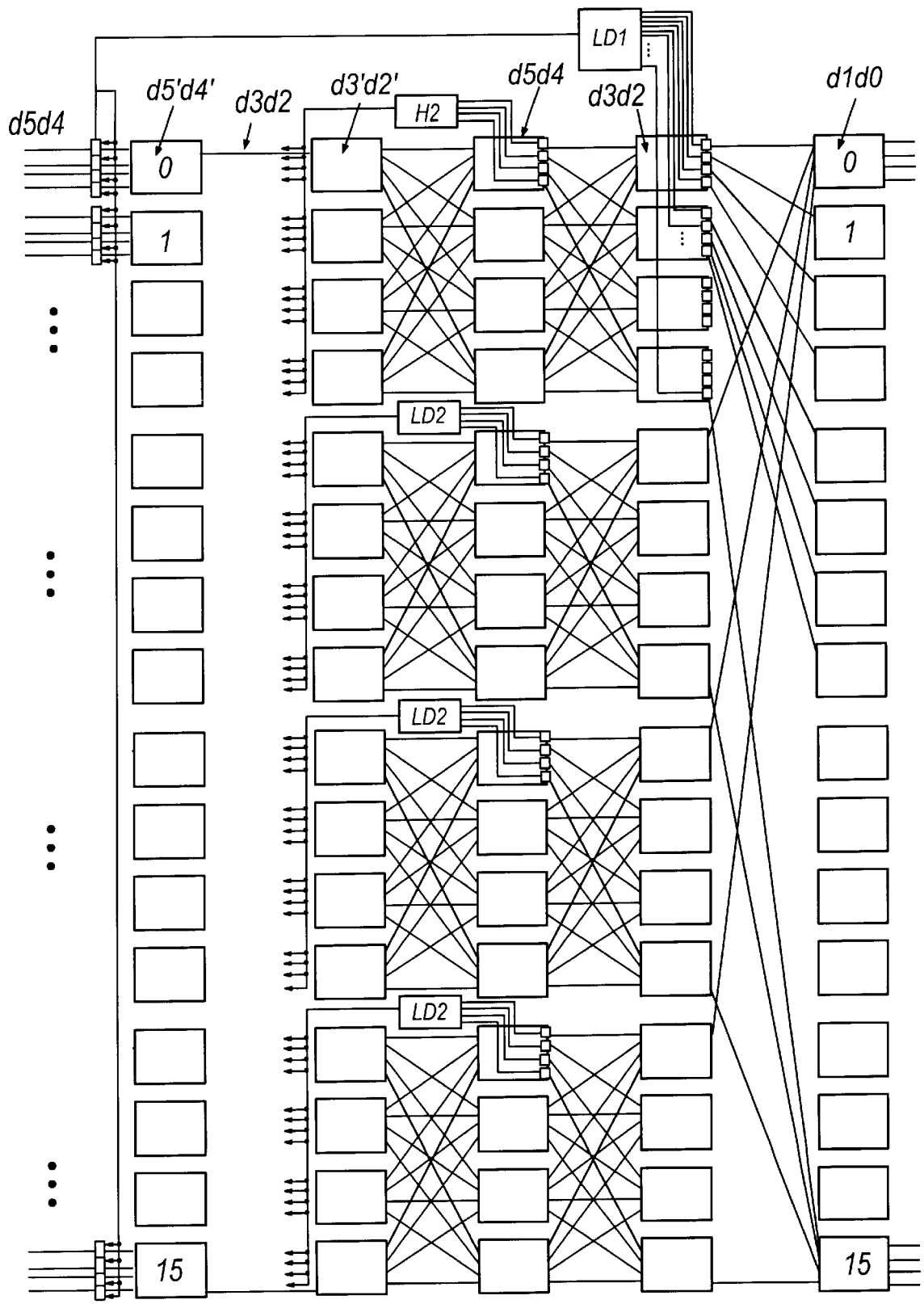
FIG. 16 shows the switching fabric of FIG. 14a when the fabric is complemented with the feedback circuitry of FIG. 11.

The embodiment shown in FIGS. 9–11 with the switching fabric optimized for hot-spot traffic may also be used when the number of switching stages is greater than three. In FIG. 16 is shown how the five-stage switching matrix of FIG. 14a can be complemented with the feedback circuitry. The load detector circuit LD1, whose inputs receive information from all the 16 outputs of the matrix group (SG1), indicates the hot-spot output of the fourth stage to all the tag converters (64 pcs.) located in each input port of the switching matrix, whereby the tag converters translate bits d5 and d4 into bits d5' and d4' that are interpreted in the first switching stage. Each switching group SG1–SG4 of the fabric includes a load detector circuit LD2 (hence totally 4 detectors in the fabric). Each load detector circuit LD2 indicates the hot-spot output of the internal stage in each switching matrix group to the tag converters (16 pcs.) placed on each input port of switching fabric group, whereby the tag converters translate bits d3 and d2 into bits d3' and d2' that are interpreted in the second switching stage. Resultingly, the abovedescribed method gives the best performance in the switching stages according to the invention to those outputs which pass the hot-spot traffic.

To a person versed in the art it is obvious that the invention is not limited by exemplifying embodiments described above with reference to the appended drawings, but rather, may be varied within the scope and inventive spirit of the appended claims and foregoing examples.

I claim:

1. A switching fabric for a packet-switched communications network, said switching fabric comprising a plurality of input ports and a plurality of output ports, and a plurality of switch elements (SE1–SE5) which are arranged in series so as to form a number of successive switching stages and are connected with each other via internal links passing from one switching state to another, whereby said switch elements and said internal links form a connection from a given input port to a desired output port, and whereby each switch element has inputs and outputs, and each switch element routes a data packet present at its given input to at least one of its outputs on the basis of routing information (SRT) carried by said data packet, and the switch element inputs of the first switching stage form said input ports and the outputs of the last switching stage of the fabric form said output ports, wherein each switch element (SE1) in at least the first switching stage is formed by a routing network element ($RE_j$) and a shift network element ($SHE_i$), connected in series with each other so that the ith output of the routing network element is connected to the ith input of the shift network element, whereby each routing network element routes the data packets simultaneously present at its inputs according to preset, fixed rules on the basis of the routing information carried by said data packets, whereby the routing information fails to include bits specific to the routing network element, and each shift network element shifts the data packet present on its ith input to its jth output, whereby the indices i and j are paired so that (a) within a given time slot, all the values of j are different from each other in a given shift network element, and (b) within a given time slot, a different value of j is assigned to each of the same-valued i's used in different shift network elements.

2. A switching fabric as defined in claim 1, characterized in that said routing network element routes the incoming data packet to its output corresponding to the output port address interpreted from said routing information.

3. A switching fabric as defined in claim 1, characterized in that said routing network element routes the incoming data packets so as to sort the data packets to the routing network element outputs into an ascending/descending order of the routing information.

4. A switching fabric as defined in claim 3, characterized in that said fabric comprises traffic monitoring means ($TM_i$) in at least one switch element, said means serving to monitor a variable indicating the traffic load imposed on the outputs of said switch element, load detecting means (LD) responsive to said monitoring means so as to select the output subject to the highest traffic load, and conversion means ($TC_i$) responsive to said load detecting means for translating the routing information on the basis of the selected output.

5. A switching fabric as defined in claim 4, characterized in that said traffic monitoring means are located in one switch element only.

6. A switching fabric as defined in claim 1, characterized in that, in the kth shift network element, the value of i is paired with j mod(n) and, in the (k+1)th shift network element, the value of i is paired with (j+1) mod(n), where n is the number of shift network element outputs.

7. A switching fabric as defined in claim 1, characterized in that in each individual shift network element, the value of j paired with the same value of l is changed from one time slot to the next so that the value of j is continuously permutated according to a preset sequence.

8. A switching fabric as defined in claim 7, characterized in that said preset sequence permutates orderly through all the outputs of said shift network element.

9. A switching fabric as defined in claim 1, characterized in that said fabric comprises a three-stage block in which the first stage switch elements have n inputs and n outputs, the second stage switch elements have l inputs and k outputs, and the third stage switch elements have m inputs and n outputs, and that the switch elements of the first stage are formed by a routing network element and a shift network element, connected in series with each other.

10. A switching fabric as defined in claim 9, characterized in that, in the ith shift network element of the first stage, the jth output is connected to the ith input of the jth second stage switch element, and, in the ith switch element of the second stage, the jth output is connected to the ith input of the jth third stage switch element.

11. A switching fabric as defined in claim 10, characterized in that said fabric comprises N1 three-stage switch element blocks, whereby each stage of the block has N2 switch elements, an input stage of N1'N2 switch elements with N1 outputs in each switch element, whereby the kth output of ith input stage switch element is connected to the ith input of the kth block of the next stage, and an output stage of N1'N2 switch elements with N1 inputs in each switch element, whereby the kth input of ith output stage switch element is connected to the ith output of the kth block of the preceding stage, thus forming a five-stage switching fabric in which said blocks form the second, third and fourth stage.

12. A switching fabric as defined in claim 10, characterized in that said fabric comprises an aggregate number NS of stages in which the switch elements of (NS-1)/2 first stages are formed by routing network elements combined with shift network elements.

* * * * *